J. B. TITTLE.
INNER TUBE FOR TIRES.
APPLICATION FILED MAR. 6, 1920.
1,366,849. Patented Jan. 25, 1921.
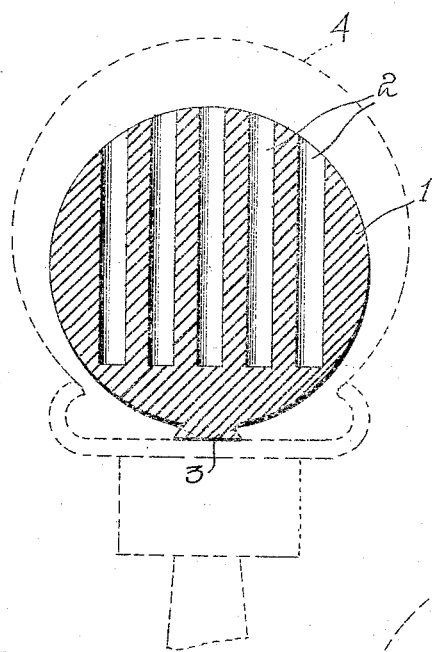
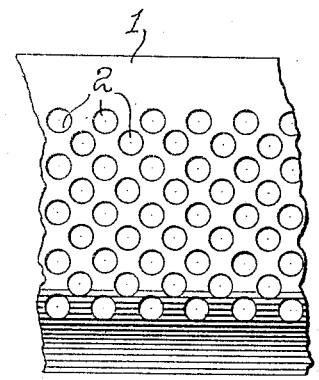
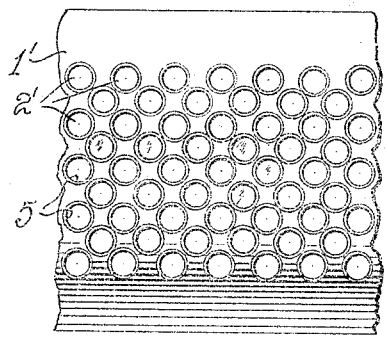
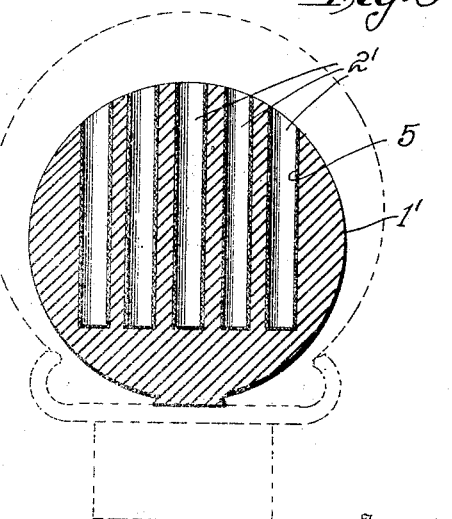
Inventor
J. B. Tittle
By Franklin N. Hogh
Attorney

UNITED STATES PATENT OFFICE.

JOHN B. TITTLE, OF JEFFERSON, OHIO.

INNER TUBE FOR TIRES.

1,366,849. Specification of Letters Patent. Patented Jan. 25, 1921.

Application filed March 6, 1920. Serial No. 363,661.

*To all whom it may concern:*

Be it known that I, JOHN B. TITTLE, a citizen of the United States, residing at Jefferson, in the county of Ashtabula and State of Ohio, have invented certain new and useful Improvements in Inner Tubes for Tires; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to provide a cushion tire for automobiles and other vehicles, in which an ordinary outer casing is used, combined with an inner core, preferably of rubber, and provided with numerous vertically extending recesses, all as more particularly hereinafter described.

The invention is clearly illustrated in its preferred form in the accompanying drawing, in which like reference characters designate corresponding parts throughout the several views. Briefly described:

Figure 1 is a transverse sectional view of an inner core, constructed in accordance with my invention, Fig. 2 is a fragmentary top plan view thereof, Fig. 3 is a view similar to Fig. 1, showing a slight modification, and Fig. 4 is a fragmentary top plan view of the modification shown in Fig. 3.

Referring now in detail to the drawing, and first to Figs. 1 and 2 thereof:

1 designates an inner core of suitable material, preferably rubber, circular in cross-section, as shown, and provided with a plurality of vertically extending recesses, or pockets 2. Preferably, the core 1 is provided on its inner periphery with a dovetailed flange 3 which seats in a correspondingly shaped recess, or cut-away portion in the ends of the outer casing 4, whereby the inner core 1 is held against creeping with respect to the outer casing 4. It will be noted that the cells 2 extend from the top or tread portion of the core, and terminate at points removed from the inner periphery thereof.

The core 1 may be constructed in one piece or in sections as may be preferred.

Referring now in detail to Figs. 3 and 4:

The modification herein shown consists of reinforcing the air cells 2' by means of the textile lining 5, preferably duck or canvas, which is molded into the inner core 1', when the same is being made. The function of this reinforcement is to strengthen the core 1', and to prevent undue spreading thereof due to the weight of the car.

The reinforcement of the columns is an important feature of this invention especially in that it materially enhances the cushioning effect, which is accomplished both by its resistance and by its causing the cellular resistance to increase the pressure at given compression.

What I claim to be new is:

A pneumatic tire core comprising a pliable annulus of substantially circular cross section, provided with a plurality of parallel cylindrical cells extending from the periphery inward radial of the axis of the wheel and substantially, but not entirely, through the annulus, the cubic capacity of the cells being substantially the whole of the body structure, except sufficient to give strength to the cells, the walls of the cells being reinforced by material other than the core material.

In testimony whereof I hereunto affix my signature.

JOHN B. TITTLE.